United States Patent
Mercer et al.

(10) Patent No.: US 12,372,039 B2
(45) Date of Patent: Jul. 29, 2025

(54) BLENDED FUEL DISPENSING SYSTEM WITH ADAPTIVE FUEL STORAGE PARAMETERS

(71) Applicants: Michael D. Mercer, Edmond, OK (US); Ronald R. Mercer, Edmond, OK (US)

(72) Inventors: Michael D. Mercer, Edmond, OK (US); Ronald R. Mercer, Edmond, OK (US)

(*) Notice: Subject to any disclaimer, the term of this patent is extended or adjusted under 35 U.S.C. 154(b) by 0 days.

(21) Appl. No.: 18/391,928

(22) Filed: Dec. 21, 2023

(65) Prior Publication Data
US 2024/0125278 A1    Apr. 18, 2024

Related U.S. Application Data

(63) Continuation of application No. 17/950,999, filed on Sep. 22, 2022, now Pat. No. 11,927,144.

(60) Provisional application No. 63/247,022, filed on Sep. 22, 2021.

(51) Int. Cl.
| | |
|---|---|
| F02D 19/06 | (2006.01) |
| F02D 19/08 | (2006.01) |
| F02D 29/06 | (2006.01) |
| F17C 3/00 | (2006.01) |
| F17C 5/00 | (2006.01) |

(52) U.S. Cl.
CPC ..... *F02D 19/0665* (2013.01); *F02D 19/0644* (2013.01); *F02D 19/085* (2013.01); *F02D 29/06* (2013.01); *F17C 3/005* (2013.01); *F17C 5/007* (2013.01); *F17C 2221/012* (2013.01); *F17C 2221/033* (2013.01); *F17C 2223/0123* (2013.01)

(58) Field of Classification Search
None
See application file for complete search history.

(56) References Cited

U.S. PATENT DOCUMENTS

| | | | |
|---|---|---|---|
| 5,207,530 A * | 5/1993 | Brooks | F17C 1/007 405/53 |
| 5,787,940 A | 8/1998 | Bonn et al. | |

(Continued)

FOREIGN PATENT DOCUMENTS

| | | | | |
|---|---|---|---|---|
| CN | 212819205 U * | 3/2021 | | B01F 15/0404 |
| CN | 113864016 A | 10/2021 | | |

(Continued)

*Primary Examiner* — Kevin R Steckbauer
(74) *Attorney, Agent, or Firm* — Hall Estill Law Firm

(57) ABSTRACT

Method and apparatus for adaptively adjusting the storage of fuels for use in a fuel blending process. First and second fuels are stored in storage vessels at an initial volumetric fuel storage ratio. A storage controller executes a performance strategy to adaptively adjust at least one storage parameter in response to a predicted or detected change in operating conditions of the system. The performance strategy can include increasing a storage pressure of at least one of the fuels and/or changing a total number of storage vessels used to store the respective fuels. A dispensing mechanism transfers a blended fuel formed from the first and second fuels in accordance with the execution of the performance strategy. The fuels can take a variety of forms including hydrogen (H2), oxygen (O2), hydrocarbons, etc. The blended fuel may be dispensed by a fueling station to a motor vehicle.

20 Claims, 5 Drawing Sheets

(56) References Cited

U.S. PATENT DOCUMENTS

| | | | |
|---|---|---|---|
| 7,128,103 B2 * | 10/2006 | Mitlitsky | H01M 8/04089 141/82 |
| 7,168,464 B2 * | 1/2007 | Diggins | F17C 7/02 141/105 |
| 7,270,209 B2 * | 9/2007 | Suess | B60K 15/03006 224/538 |
| 7,497,191 B2 * | 3/2009 | Fulton | H01M 8/0606 123/492 |
| 7,850,034 B2 * | 12/2010 | Munshi | B60K 15/03006 220/560.04 |
| 7,861,696 B2 * | 1/2011 | Lund | F02C 9/40 123/575 |
| 7,966,802 B2 | 6/2011 | Szepek et al. | |
| 8,091,536 B2 | 1/2012 | Munshi et al. | |
| 8,282,023 B2 | 10/2012 | Olander et al. | |
| 8,301,359 B1 * | 10/2012 | Sagar | G05B 19/042 123/1 A |
| 8,315,788 B2 * | 11/2012 | Surnilla | G01C 21/26 701/123 |
| 8,418,732 B2 * | 4/2013 | Cohen | G05D 11/132 141/94 |
| 8,459,213 B2 * | 6/2013 | Moriarty | F03G 7/08 123/3 |
| 8,469,009 B2 | 6/2013 | Munshi et al. | |
| 8,583,350 B1 * | 11/2013 | Sagar | G05B 19/042 290/51 |
| 8,613,201 B2 | 12/2013 | Bayliff et al. | |
| 8,751,140 B2 * | 6/2014 | Surnilla | G01C 21/26 701/123 |
| 9,133,011 B2 * | 9/2015 | McAlister | H01M 8/04753 |
| 9,284,178 B2 * | 3/2016 | Donnelly | B60S 5/02 |
| 9,287,178 B2 | 3/2016 | Li et al. | |
| 9,309,811 B2 * | 4/2016 | Swann | F02C 9/40 |
| 9,359,568 B2 | 6/2016 | Baustian et al. | |
| 9,739,419 B2 * | 8/2017 | Donnelly | B67D 7/04 |
| 9,739,919 B2 | 8/2017 | Zhang et al. | |
| 9,796,910 B2 | 10/2017 | Nevison | |
| 10,195,583 B2 | 2/2019 | Costantino et al. | |
| 10,337,669 B2 | 7/2019 | Mercer et al. | |
| 10,340,693 B2 | 7/2019 | Lansing et al. | |
| 10,718,468 B2 | 7/2020 | Petit et al. | |
| 10,837,601 B2 * | 11/2020 | Mercer | B65G 5/00 |
| 11,220,427 B2 * | 1/2022 | Lugtigheid | C01B 3/065 |
| 11,525,544 B2 * | 12/2022 | Clarke | F17C 1/00 |
| 11,680,684 B2 | 6/2023 | Mercer et al. | |
| 11,681,307 B1 * | 6/2023 | Chedsey | E21B 43/295 137/14 |
| 11,828,417 B2 * | 11/2023 | Clarke | B64D 37/30 |
| 11,885,270 B2 * | 1/2024 | Mercer | F17C 3/005 |
| 11,927,144 B2 * | 3/2024 | Mercer | F17C 5/007 |
| 2003/0113602 A1 * | 6/2003 | Nau | B60L 58/30 180/68.5 |
| 2006/0014070 A1 * | 1/2006 | Kaye | H01M 8/04201 429/513 |
| 2006/0033322 A1 * | 2/2006 | Suess | B60K 15/07 280/830 |
| 2006/0154134 A1 | 7/2006 | Vinsant | |
| 2008/0057359 A1 | 3/2008 | Venkataraman et al. | |
| 2009/0064586 A1 * | 3/2009 | Munshi | F17C 5/04 48/199 FM |
| 2009/0320789 A1 * | 12/2009 | Lund | F02D 19/0665 123/299 |
| 2010/0000434 A1 * | 1/2010 | Pristash | F42C 11/008 102/200 |
| 2010/0107994 A1 * | 5/2010 | Moriarty | F03G 7/08 310/156.01 |
| 2011/0126545 A1 * | 6/2011 | Loeven, II | F23R 3/36 60/39.281 |
| 2011/0137470 A1 * | 6/2011 | Surnilla | G01C 21/26 700/282 |
| 2013/0008173 A1 | 1/2013 | Fletcher et al. | |
| 2013/0008557 A1 * | 1/2013 | Cohen | G05D 11/132 141/105 |
| 2013/0112313 A1 * | 5/2013 | Donnelly | F17C 5/06 141/98 |
| 2014/0263401 A1 * | 9/2014 | McAlister | H01M 8/04425 222/23 |
| 2015/0114009 A1 * | 4/2015 | Gates | F25J 1/0022 62/50.1 |
| 2015/0114351 A1 * | 4/2015 | Lund | F02M 43/00 123/457 |
| 2016/0195220 A1 * | 7/2016 | Donnelly | B67D 7/04 141/94 |
| 2018/0223746 A1 * | 8/2018 | Mack | G01C 21/166 |
| 2020/0055730 A1 * | 2/2020 | Lugtigheid | B67D 7/04 |
| 2022/0009648 A1 * | 1/2022 | Clarke | H01M 8/04373 |
| 2022/0074548 A1 * | 3/2022 | Clarke | H01M 8/04425 |
| 2022/0081288 A1 * | 3/2022 | Lugtigheid | B67D 7/04 |
| 2022/0090739 A1 * | 3/2022 | Stager | F17C 7/04 |
| 2022/0205590 A1 * | 6/2022 | Clarke | B64D 37/06 |
| 2023/0086470 A1 * | 3/2023 | Mercer | F02D 19/0644 123/575 |
| 2023/0088217 A1 * | 3/2023 | Mercer | F02D 29/06 141/94 |
| 2023/0213151 A1 | 7/2023 | Mercer et al. | |
| 2023/0243474 A1 * | 8/2023 | Clarke | B60L 50/72 244/135 R |
| 2023/0246211 A1 * | 8/2023 | Montgomery | H01M 8/04014 429/444 |
| 2023/0250923 A1 | 8/2023 | Mercer et al. | |
| 2023/0383703 A1 * | 11/2023 | Neutzler | F02D 41/0027 |
| 2023/0400154 A1 * | 12/2023 | Cordova | F17C 7/04 |
| 2024/0125277 A1 * | 4/2024 | Mercer | F17C 5/007 |
| 2024/0125278 A1 * | 4/2024 | Mercer | F02D 19/0665 |
| 2025/0043739 A1 * | 2/2025 | Mercer | F02D 19/0644 |

FOREIGN PATENT DOCUMENTS

| | | | | |
|---|---|---|---|---|
| CN | 114529056 A | * | 5/2022 | G06Q 10/04 |
| CN | 217763522 U | * | 11/2022 | |
| CN | 115796323 A | * | 3/2023 | |
| EP | 2979743 A1 | * | 2/2016 | B01D 53/22 |
| EP | 2979743 B1 | * | 10/2019 | B01D 53/22 |
| ES | 2764389 T3 | * | 6/2020 | B01D 53/22 |
| JP | 2000017470 A | * | 1/2000 | |
| JP | 2012082791 A | * | 4/2012 | |
| JP | 5735252 B2 | * | 6/2015 | |
| JP | 2021172631 A | * | 11/2021 | |
| WO | WO-2011050289 A2 | * | 4/2011 | F03G 6/001 |

* cited by examiner

BLENDED FUEL DISPENSING SYSTEM WITH ADAPTIVE FUEL STORAGE PARAMETERS

RELATED APPLICATIONS

The present application is a continuation of co-pending U.S. patent application Ser. No. 17/950,999 filed Sep. 22, 2022, and makes a claim of domestic priority under 35 U.S.C. 119(e) to U.S. Provisional Patent Application No. 63/247,022 filed Sep. 22, 2021. The contents of both of these applications are hereby incorporated by reference.

SUMMARY

Various embodiments of the present disclosure are generally directed to a method and apparatus for adaptively adjusting fuel storage parameters in a blended fuel dispensing system.

Without limitation, in some embodiments first and second fuels are stored in storage vessels at an initial volumetric fuel storage ratio. A storage controller executes a performance strategy to adaptively adjust at least one storage parameter in response to a predicted or detected change in operating conditions of the system. The performance strategy can include increasing a storage pressure of at least one of the fuels and/or changing a total number of storage vessels used to store the respective fuels. A dispensing mechanism transfers a blended fuel formed from the first and second fuels in accordance with the execution of the performance strategy. The fuels can take a variety of forms including hydrogen (H2), oxygen (O2), hydrocarbons, etc. The blended fuel may be dispensed by a fueling station to a motor vehicle.

These and other features and advantages of various embodiments can be understood from a review of the following detailed description in conjunction with a review of the associated drawings.

DETAILED DESCRIPTION

Generally, the present disclosure is directed to the intelligent storage of multiple fuels to provide a reliable and safe fuel blend to one or more downstream fuel consumers.

The consumption of fuels has provided society with a number of different practical efficiencies for generations. From the burning of wood and coal for heat to the consumption of refined petroleum for vehicle propulsion, transitioning a fuel into a different state can provide comfort and decreased effort to conduct activities. As greater and greater amounts of people rely on the consumption of fuels for daily activity, the storage of relatively large volumes of fuels has become increasingly difficult and dangerous. Such heightened fuel demand in concert with dynamic fuel supply can present challenges to the safe storage of fuels to allow and efficient fulfillment of downstream consumers.

Various embodiments address these challenges by employing a storage structure such as at least one fuel storage pod that utilizes multiple separate underground storage vessels to safely store one or more fuels for downstream consumption. The storage of fuels in separate vessels allows a storage module to intelligently control pressures, volumes, capacity, available power, and number of fuels stored to mitigate the variability of fuel supply and downstream fuel demand. The intelligent storage of multiple different fuels in an underground storage pod further allows for efficient fuel blending as pressure and volume of different fuels are controlled to provide a predetermined fuel ratio that is conducive to optimized downstream fuel consumption.

Figure 1:
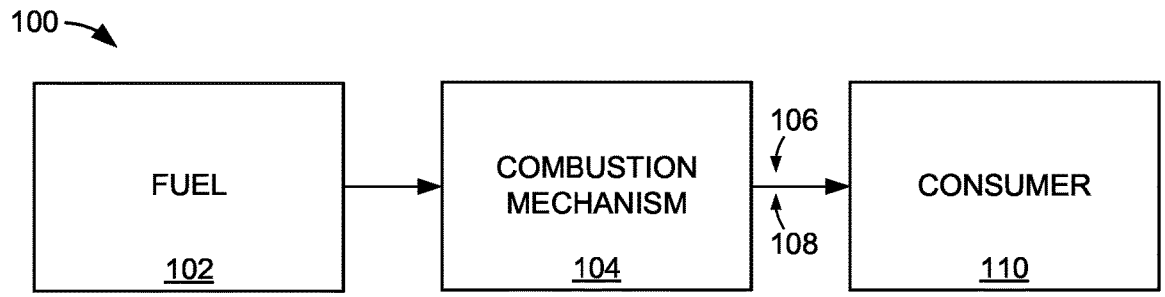
FIG. 1 is a block representation of an example fuel storage environment in which assorted embodiments can be practiced.

FIG. 1 depicts portions of an example environment 100 in which embodiments of an intelligent fuel storage system can be practiced. The delivery of one or more fuels 102, such as coal, natural gas, steam, hydrogen, gasoline, or diesel, allows a combustion mechanism 104 to convert the fuel 102 into mechanical 106 and/or electrical 108 energy that is utilized immediately, or stored for later consumption by one or more downstream consumers 110. It is contemplated that that fuels 102 are employed by an electrical generator mechanism 104 to create electricity that is distributed to downstream consumers 110 via an electrical distribution grid.

However, the cost and supply of fuels 102 can vary over time, which jeopardizes the efficiency and consistency of fuel 102 delivery and subsequent transition into mechanical/electrical energy that can be utilized by downstream consumers 108. As technology has allowed natural forces, such as wind, water, and sun, to be converted to fuels 102, the burden on fossil fuels can be reduced. Yet, greater numbers of consumers 110 are utilizing greater amounts of fuel 102, such as to power electrically powered vehicles, operate internal combustion engines, fly, and transport goods.

Figure 2:
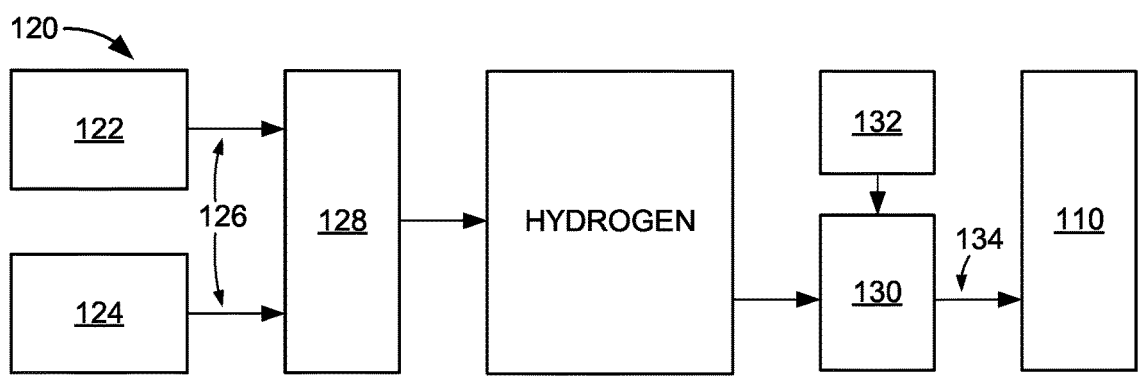
FIG. 2 depicts a block representation of an example energy consumption environment capable of being optimized with various embodiments.

FIG. 2 depicts a block representation of an example energy consumption environment 120 that employs natural forces to supplement fossil fuels for mechanical/electrical energy generation. As shown, a wind turbine 122 and solar panel 124 respectively convert natural forces into electrical energy 126. While the produced electrical energy 126 may be consumed immediately, restrictions on electrical energy transmission often limit the amount of energy that can be consumed. Thus, some, or all, of the electrical energy 126 can be employed in an electrolysis operation 128 where water is converted into separate hydrogen (H2) and oxygen (O2) gases that can be stored and utilized at a later time. It is contemplated that some electrolysis operations 128 vent produced oxygen gas to simply store produced hydrogen, which can be more easily combusted than oxygen.

However, the storage and transportation of hydrogen gas is riddled with logistic complications and safety considerations that are inefficient. Despite such inefficiency, it is contemplated that hydrogen can be supplied to an electrical energy generator 130 alone, or in combination with other fuels 132, such as natural gas, to be consumed in the creation of electricity 134 that is delivered to downstream consumers 110. The supplementation of other fuels 132 with hydrogen gas produced from natural forces can be beneficial, but can be cost prohibitive, particularly when the cost of maintenance of the energy capturing devices (122/124) is added to the transportation and storage of hydrogen.

Figure 3:
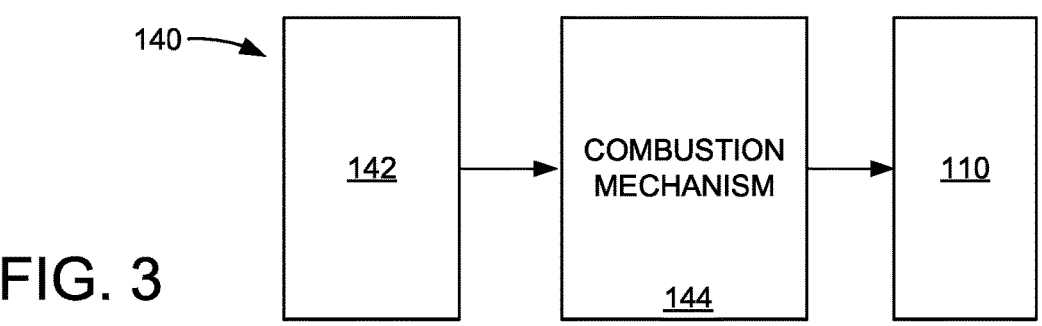
FIG. 3 represents a block representation of portions of an example fuel consumption system arranged in accordance with some embodiments.

FIG. 3 depicts a block representation of portions of an example fuel consumption utilization system 140 where one or more fuels 142 are supplied to a fuel combustion mechanism 144, such as a vehicle or power plant, to be converted into mechanical and/or electrical power that can be employed by downstream consumers 110. While the power plant 144 may produce electricity at any volume, pricing and availability models imposed by regulatory agencies create dynamic profitability structures for the translation of fuels 142 into electricity. Hence, the static capabilities of power plants 144 to produce electricity in certain volumes at unmitigated costs limits the profitability of the power plant 144, even with the inclusion of fuels sourced from cheaper origins, such as hydroelectric, wind, and solar devices.

Figure 4:
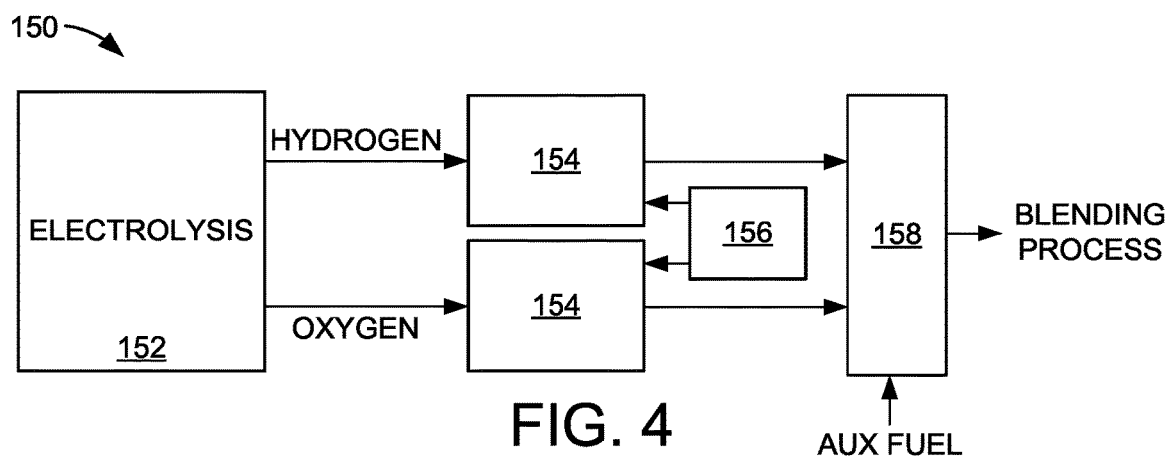
FIG. 4 conveys a block representation of an example fuel utilization system configured in accordance with assorted embodiments.

FIG. 4 depicts a block representation of an example fuel utilization system 150 configured in accordance with various embodiments to provide optimized delivery of fuels and generation of electricity by a combustion mechanism 144. Although not required or limiting, electrolysis 152 can be used to convert water into separate hydrogen and oxygen gases that are safely transported to a storage facility for later use as fuel. As a non-limiting example, oxygen and hydrogen can be stored in separate vessels of interconnected storage pods 154. A storage module 156 can intelligently manage and control the assorted fuels stored in the respective pods 154 to ensure the sufficient and safe availability of the fuels for later combustion.

It is contemplated that hydrogen and oxygen are delivered directly to the combustion mechanism 144, but some embodiments blend the respective gases to provide a fuel ratio selected by a blend module 158 that provides optimal fuel transition into energy, which may involve considerations for timing, efficiency, and cost. As a result of the intelligent storage and blending of gases produced from natural forces, the combustion mechanism 144 can enjoy cost mitigation of other fuels, such as natural gas, along with the ability to employ dynamic energy generation timing and volume due to the selected fuel blend. In some embodiments, the storage module 156 selects where to deliver gases, such as to vehicles powered by hydrogen.

Figure 5:
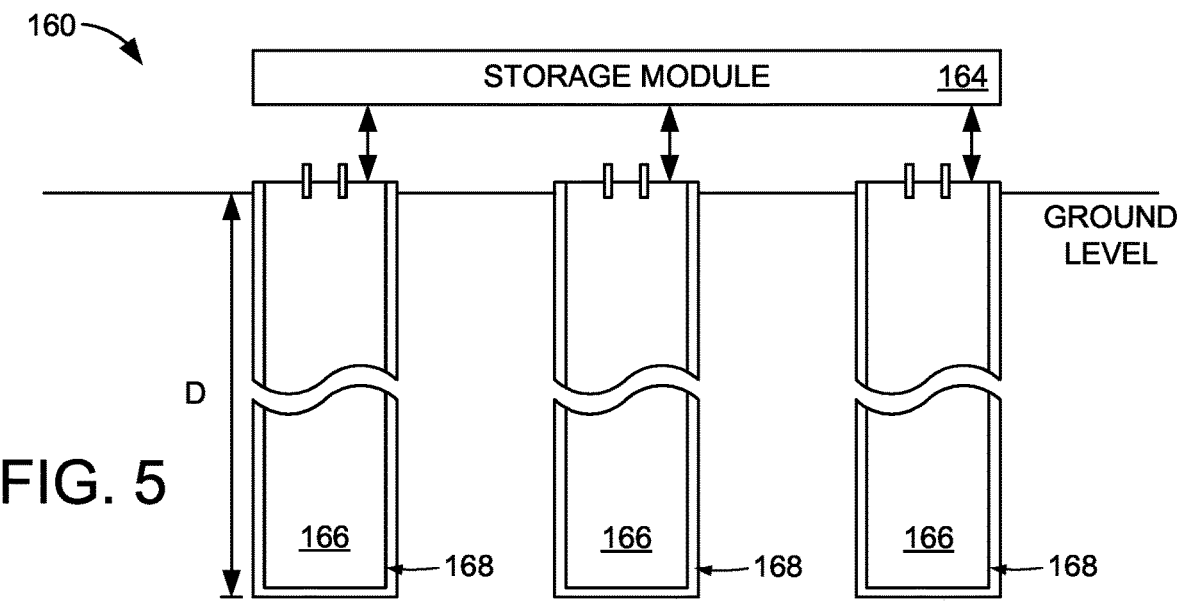
FIG. 5 depicts a line representation of portions of an example fuel storage system employed in accordance with various embodiments.

FIG. 5 illustrates portions of an example energy utilization system 160 where a storage structure in the form of a storage pod 162 is connected to a storage module 164 that employs at least a controller and storage circuit to generate a storage strategy that is executed to maintain the availability of at least two different gases, such as hydrogen and oxygen, for a downstream power plant. Although not required or limiting, a storage pod 162 can include multiple individual vessels 166 that each extend a depth (D) underground for safety and efficiency of space (e.g., "subterranean vessels"). That is, above ground tanks/vessels may be utilized, but take up large volumes of space and provide safety concerns that are highly mitigated by the use of subterranean vessels (e.g., positioning the vessels 166 below ground).

The respective vessels 166 may be constructed with interchangeable sleeves 168 that allow for the mitigation of material embrittlement while providing an increased degree of safety compared to vessels without interchangeable internal materials. The separation of vessels 166 allows the storage module 164 to alter what gases are stored and at what pressures the gases are to be kept, which provides the ability to dynamically adjust to power plant demand to increase electricity generation efficiency and performance.

Figure 6:
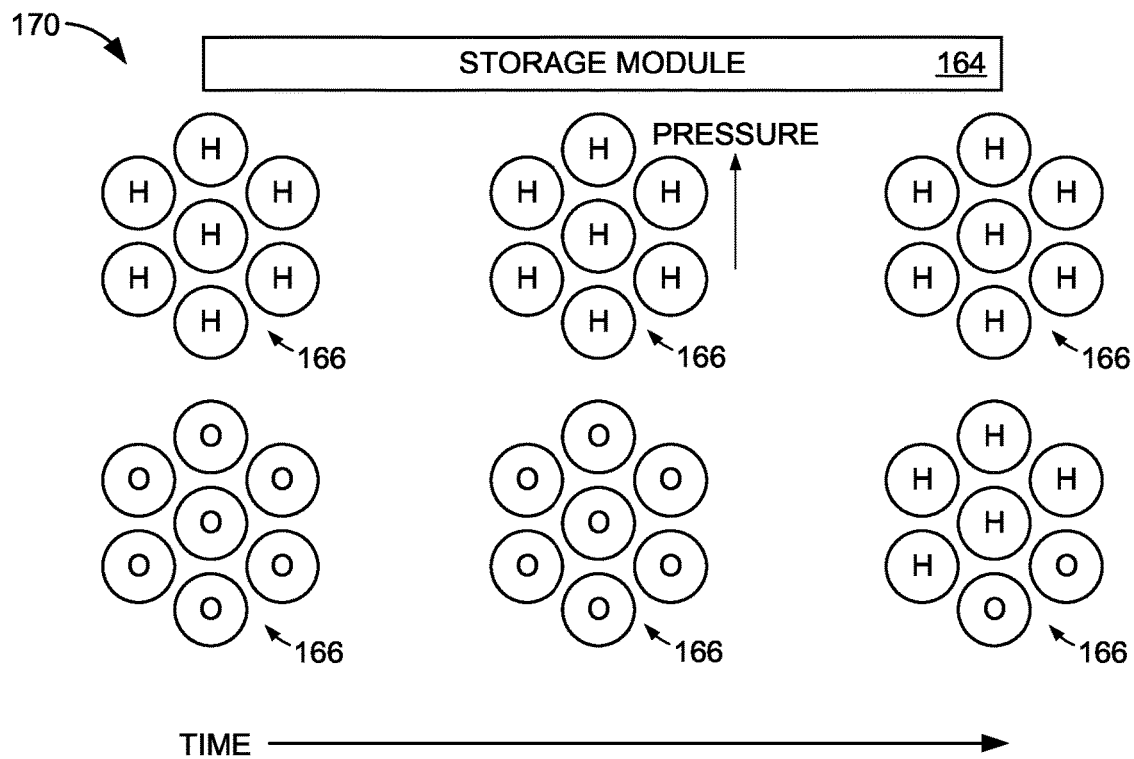
FIG. 6 conveys a line representation of portions of an example fuel storage system operated in accordance with some embodiments.

FIG. 6 depicts an example storage pod 170 utilized by a storage module 164 over time in accordance with some embodiments. Initially, the storage module 164 directs equal volumes of hydrogen (H) and oxygen (O) to be stored in the respective vessels 166. In response to demand, cost, and/or vessel maintenance, the storage module 164 can choose to store more hydrogen than oxygen by increasing the pressure of some vessels and/or utilizing more vessels 166 for hydrogen than for oxygen. The storage module 164 may further adjust the ratio of volume of stored hydrogen to volume of stored oxygen by changing the number of vessels 166 storing hydrogen, as shown.

Figure 7:
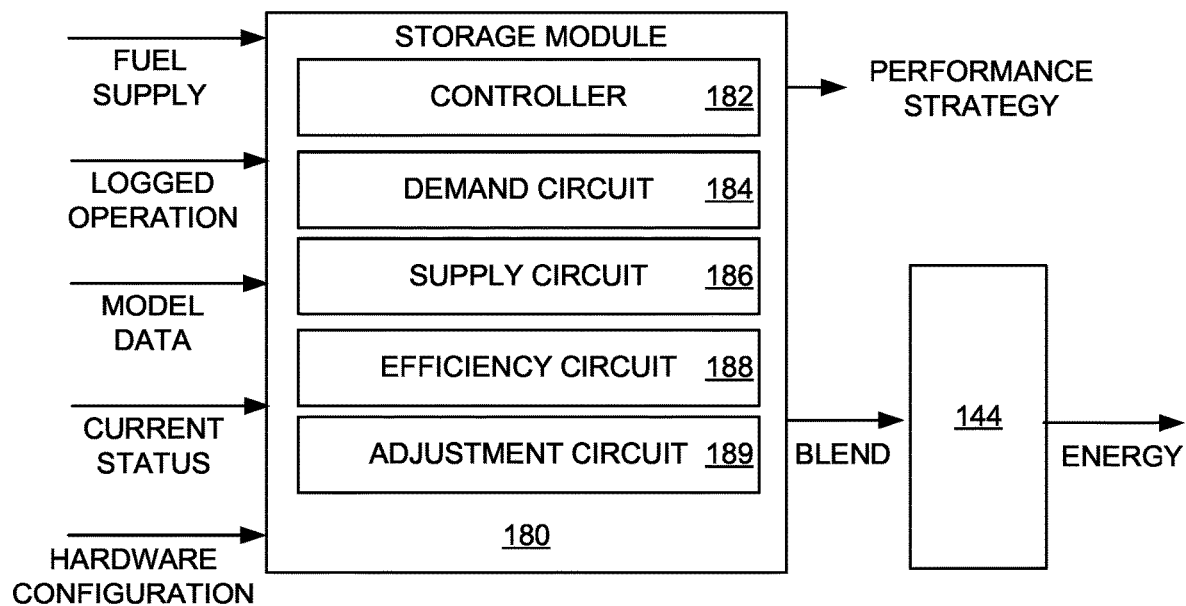
FIG. 7 shows a block representation of portions of an example storage module that can be utilized in assorted embodiments of a fuel storage system.

By intelligently altering the pressure and/or gas stored in a vessel, the storage module 164 can mitigate vessel embrittlement and adapt to changing electricity generation conditions, such as cost, demand, and timing. The addition of intelligent blending of gases can complement the intelligent storage of gases to optimize the efficiency and performance of a power plant. FIG. 7 depicts a block representation of an example storage module 180, also referred to as a blend module that can employ a controller 182 to generate and execute a blending strategy that provides a predetermined fuel ratio to one or more electrical energy generators.

The blend module 180 can have a demand circuit 184 that evaluates past, current, and predicted future demand for fuels to provide the blend strategy with prescribed volumes of fuels that can be consistently and reliably supplied. The demand circuit 184 allows the blend strategy to be practical and executable without undue delay from lack of fuel supply. A supply circuit 186 can operate with the storage module of a system to determine the real-time and future fuel supply capabilities of a system, which corresponds with the ability of the blend module 180 to provide a fuel ratio prescribed by the blending strategy.

The fuel ratio that provides optimized electrical generation efficiency and cost can be determined by an efficiency circuit 188 that evaluates environmental conditions as well as the operating performance of an electrical generator. The efficiency circuit 188 can set different fuel ratios correlating to any number of factors, such as cost of auxiliary fuel (natural gas), dynamic operating efficiency of a generator, and humidity of ambient air, to provide fuel at minimal cost without jeopardizing electrical generation timing or efficiency.

With the blending strategy proactively setting different fuel ratios correlated to different detected, or predicted, electrical generation parameters, along with the consideration for fuel cost, electrical grid selection, and electricity pricing models, the blend module 180 can provide quick and dynamic adjustments to the storage and/or supply of fuels to maintain electrical power generation at the lowest cost and highest possible efficiency, as shown by adjustment circuit 189. The blend may also be optimized for other machines employing turbines, such as jet engines, to increase operational efficiency while decreasing fuel cost.

Alternatively, the blending strategy can be optimized for non-electrical power plant usage, such as in internal combustion engines, locomotives, or industrial equipment. In other words, the blend of fuels and air can be optimized by the blend module for combustion engines due to the relatively high octane rating of auxiliary fuels, such as natural gas, and the ability to mitigate unburned hydrocarbons by blending pure hydrogen. It is noted that hydrogen burns relatively quickly for a large concentration range, such as 5-75%, which results in a faster, more complete, and more efficient burn for combustion engines of all displacements. As an another non-limiting example, the blend could be optimized for large vessels, such as trains or ships, by utilizing more pure oxygen that causes diesel engines to operate more efficiently.

Figure 8:
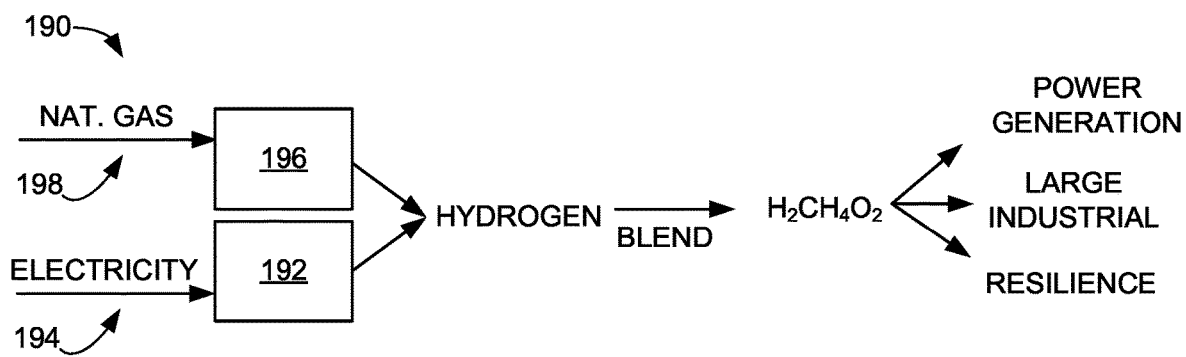
FIG. 8 displays a line representation of portions of an example fuel storage system arranged in accordance with various embodiments.

FIG. 8 depicts a block representation of an example blending procedure 190 that can be carried out by the blend module 180 in accordance with some embodiments. Through the transformation of water into hydrogen via electrolysis 192 from electricity from natural forces 194, such as wind, water, geothermal, or solar energy, or via steam methane reforming 196 from one or more natural gas sources 198, the blend strategy is conducted to create a predetermined mixture of different gases, which can be defined as a molar gas fraction.

The predetermined blend of gases can be selected with respect to the operational efficiency of a power generator, such as a blend that decreases maintenance demand or operational stress on generator components, or selected with respect to the cost per unit of electricity generated. While not limiting, the intelligent modification of the mixture of gases in accordance with a predetermined blending strategy allows for electrical power generation optimized for cost, operational efficiency, or speed.

Figure 9:
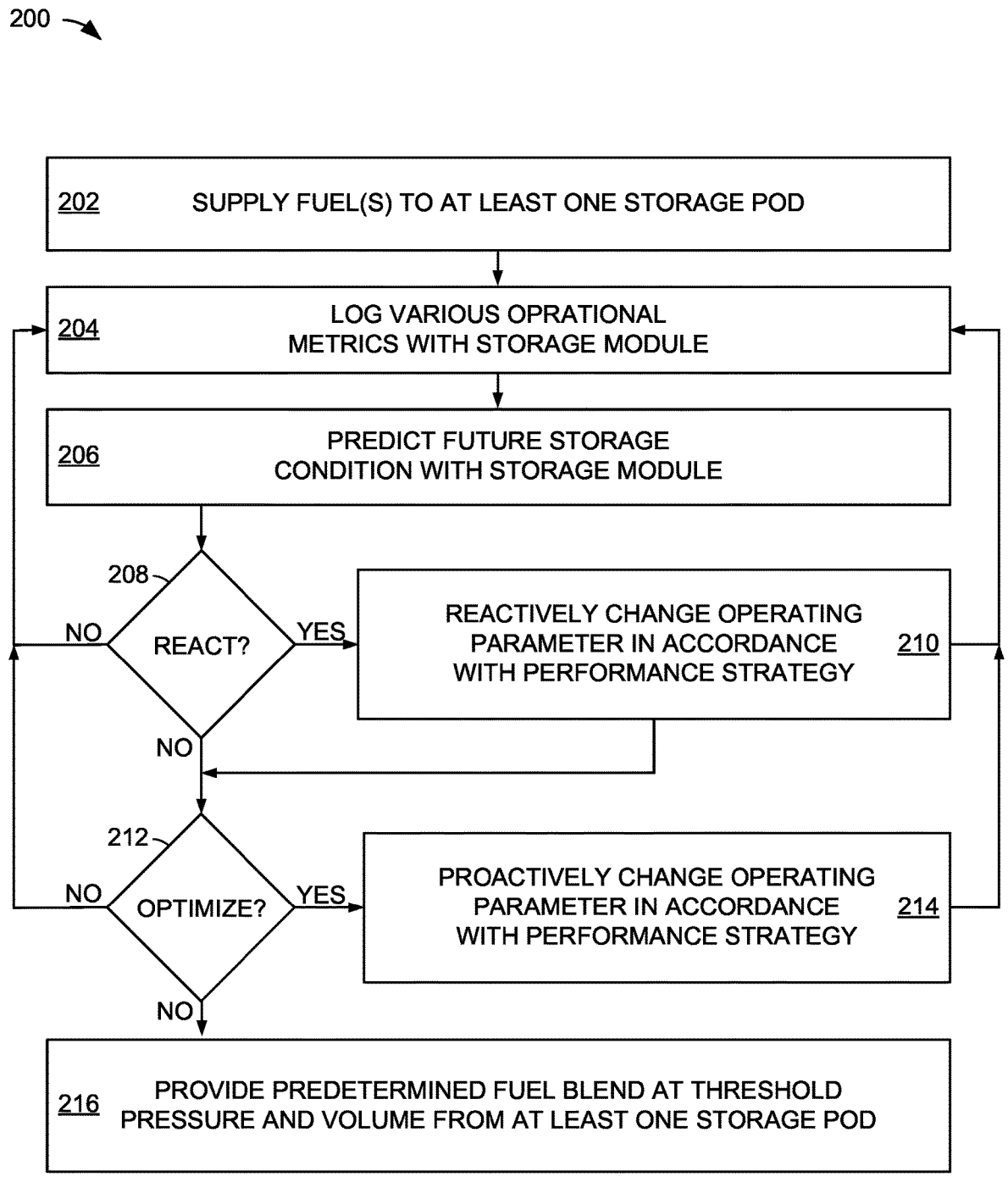
FIG. 9 conveys an example fuel storage routine that can be carried out embodiments of the fuel storage system of FIGS. 1-8.

FIG. 9 is a flowchart of an example energy utilization routine 200 that can employ assorted embodiments of FIGS. 1-8. Natural forces are captured in step 202 and transitioned into electrical energy that is immediately utilized in one or more electrolysis operations in step 204 to create hydrogen gas and oxygen gas that are each captured and stored in step 206. Via one or more transportation means, step 208 moves the stored gases each to vessels of a storage pod connected to a storage module.

The storage module dynamically adjusts the gas storage parameters, such as pressure and/or ratio of stored gas volumes, over time in step 210 in response to decision 212 determining a change in supply, cost, and/or demand is imminent or predicted. At the conclusion of step 210, or in the event decision 212 does not prompt a change in storage parameters, step 214 executes a blending strategy to provide a fuel ratio from the storage pod to a power plant to allow for the generation of electrical energy. Decision 216 evaluates if changes to electricity demand and/or pricing has changed. If so, step 218 changes to a different fuel ratio of the blending strategy. It is also contemplated that step 218 can alter the fuel ratio in response to other detected or predicted conditions, such as supply of fuel, cost of fuel, or operating efficiency of power plant generators. With the optimal fuel ratio, step 220 can proceed to generate electricity that is supplied to consumers via a power grid.

Figure 10:
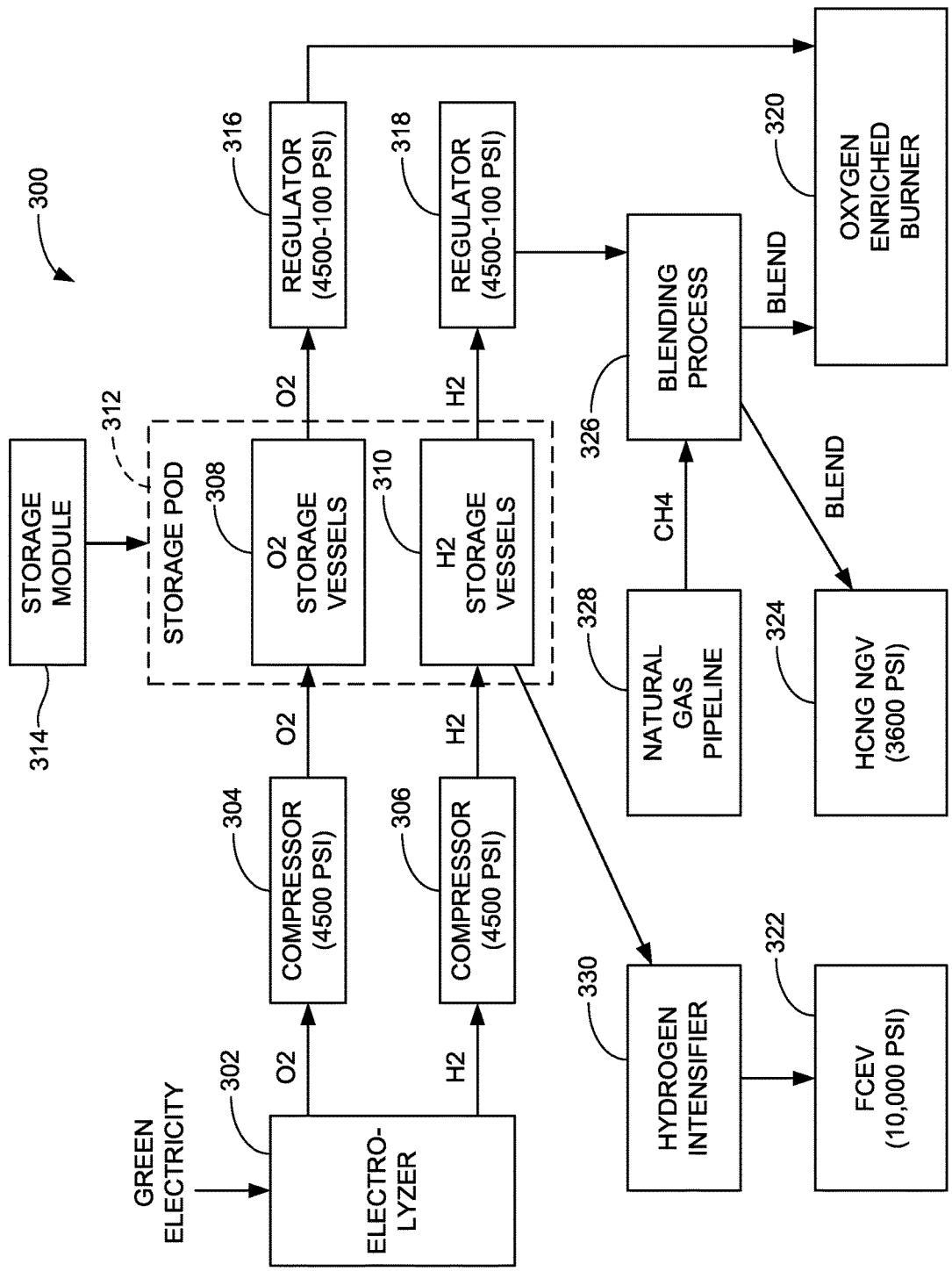
FIG. 10 provides another example power utilization system constructed and operated in accordance with further embodiments.

FIG. 10 provides another example power utilization system 300 constructed and operated in accordance with further embodiments. Various alternatives can be utilized. An electrolyzer 302 operates from a green electricity input to split water into respective oxygen (O2) and hydrogen (H2) streams. The streams are respectively compressed using compressors 304, 306 for storage in respective storage vessels 308, 310 of one or more storage pods 312 under the control of a storage module 314. The fuels are shown to be stored at a storage pressure of 4500 pounds per square inch (PSI), and regulators 316, 318 are used as desired to reduce the storage pressure to a lower delivery pressure such as 100 PSI. Other respective pressures can be used as required.

The system 300 can be configured to supply gases to various receiving mechanisms, such as an oxygen enriched burner 320, a pure hydrogen fuel cell electric vehicle (FCEV) 322 and/or a natural gas powered vehicle 324, such as a hydrogen compressed natural gas (HCNG) compatible natural gas vehicle (NGV). The burner 320 is fueled using a stream of regulated O2 as well as a blend of regulated H2 and natural gas (CH4) supplied by a blending process 326 and a natural gas pipeline 328. The FCEV 322 is fueled using high pressure compressed hydrogen (such as at a delivery pressure of 10,000 PSI) established by a hydrogen intensifier 330. The HCNG NGV is fueled using a blend of H2 and CH4 from the blending process 326 at another suitable delivery pressure such as 3600 PSI.

Accordingly, embodiments are generally directed to the intelligent storage of gases that can be utilized to generate electricity and the intelligent blending of fuels to optimize operational efficiency and cost. The storage module can provide dynamic volumes and pressures for gas storage that can mitigate and/or prevent material embrittlement as well as maintain optimal supply of gases for blending and power generation purposes. The ability to interchange sleeves of a gas storage vessel further combats embrittlement without incurring large costs associating with replacing the entirety of a vessel. The operation of the blend module provides intelligent adaptations to changing cost, demand, supply, and operational efficiencies through the dynamic fuel ratio selection.

What is claimed is:

1. An apparatus comprising:
    a storage structure comprising a plurality of storage vessels, the storage structure concurrently storing a first overall volume of a first fuel using a first set of the storage vessels and a second overall volume of a second fuel using a second set of the storage vessels to provide a first volumetric storage ratio of the first fuel to the second fuel within the storage structure;
    a storage module comprising a storage controller configured to execute a performance strategy responsive to a predicted or detected operating condition associated with the storage structure or a receiving mechanism connectable to the storage structure, the execution of the performance strategy causing the storage module to perform at least a selected one of increasing a storage pressure of a selected one of the first fuel or the second fuel within the storage structure or changing a total number of the storage vessels in a selected one of the first set or the second set of storage vessels in the storage structure to provide a different, second volumetric storage ratio; and
    a dispensing mechanism configured to transfer a blended fuel to the receiving mechanism responsive to the execution of the performance strategy, the blended fuel comprising a blend of the first fuel and the second fuel at a selected delivery pressure and delivery ratio.

2. The apparatus of claim 1, wherein the first fuel is hydrogen (H2).

3. The apparatus of claim 2, wherein the second fuel is a hydrocarbon.

4. The apparatus of claim 2, wherein the second fuel is oxygen ($O_2$).

5. The apparatus of claim 1, wherein the blended fuel comprises H2 and compressed natural gas (CNG).

6. The apparatus of claim 1, wherein the receiving mechanism is a motor vehicle and the dispensing mechanism is configured to transfer the blended fuel to a storage tank of the motor vehicle.

7. The apparatus of claim 1, wherein the first and second fuels are each stored as a gas and the storage vessels in each of the first and second sets of storage vessels are pressurized vessels of a storage pod.

8. The apparatus of claim 1, wherein the blend ratio corresponds to the second volumetric storage ratio of the first fuel to the second fuel.

9. The apparatus of claim 1, further comprising a first compressor configured to flow the first fuel into the first set of storage vessels at a first storage pressure, and a second compressor configured to flow the second fuel into the second set of storage vessels at a second storage pressure.

10. The apparatus of claim 1, further comprising a pressure adjustment mechanism that increases or decreases a selected one of the first fuel or the second fuel from a first steady-state pressure level to a second steady-state pressure level as the selected one of the first fuel or the second fuel is flowed from the storage structure for use by a receiving mechanism.

11. The apparatus of claim 1, wherein at least a portion of the first or second sets of the storage vessels are subterranean vessels.

12. The apparatus of claim 1, wherein at least a portion of the first or second sets of the storage vessels are positioned above ground.

13. The apparatus of claim 1, wherein the storage controller comprises a programmable processor configured to execute associated program instructions stored in a processor memory.

14. The apparatus of claim 1, wherein the receiving mechanism is a fuel combustion mechanism of a power plant configured to generate electrical power.

15. A method comprising:
   storing, in a storage structure, a first volume of a first fuel in at least a first storage vessel and a second volume of a second fuel in at least a second storage vessel to provide a first volumetric storage ratio;
   executing a performance strategy with a storage controller circuit in response to a detected change in an operating condition associated with the storage structure or a receiving mechanism connectable to the storage structure, the execution of the performance strategy causing the storage module to perform at least a selected one of increasing a storage pressure of a selected one of the first fuel or the second fuel within the storage structure or increasing a total number of storage vessels in the storage structure used to store the respective first or second fuels to provide a different, second volumetric storage ratio; and
   dispensing a blended fuel to the receiving mechanism responsive to the execution of the performance strategy, the blended fuel comprising a blend of the first fuel and the second fuel at a selected delivery pressure and delivery ratio.

16. The method of claim 15, wherein the storage structure comprises at least one storage pod configured to support a plurality of the storage vessels within a subterranean bore.

17. The method of claim 15, wherein the execution of the performance strategy comprises use of a compressor to increase the storage pressure of at least a selected one of the first or second fuels within the storage structure.

18. The method of claim 15, wherein the execution of the performance strategy provides a different, updated blend of the first fuel and the second fuel to the receiving mechanism.

19. The method of claim 15, wherein the first fuel is hydrogen (H2), the second fuel is a hydrocarbon, the blended fuel is dispensed to a storage tank of a motor vehicle, and at least one of the first and second sets of storage vessels are subterranean vessels.

20. The method of claim 15, wherein the blended fuel is dispensed to a selected one of a storage tank of a motor vehicle or a fuel combustion mechanism of a power plant configured to generate electrical power.

* * * * *